(12) United States Patent
Zhao et al.

(10) Patent No.: US 11,307,668 B2
(45) Date of Patent: Apr. 19, 2022

(54) GESTURE RECOGNITION METHOD AND APPARATUS, ELECTRONIC DEVICE, AND STORAGE MEDIUM

(71) Applicant: SENSETIME INTERNATIONAL PTE. LTD., Singapore (SG)

(72) Inventors: Haiyu Zhao, Singapore (SG); Kaige Chen, Singapore (SG); Daming Niu, Singapore (SG)

(73) Assignee: SENSETIME INTERNATIONAL PTE. LTD., Singapore (SG)

( * ) Notice: Subject to any disclaimer, the term of this patent is extended or adjusted under 35 U.S.C. 154(b) by 0 days.

(21) Appl. No.: 16/901,111

(22) Filed: Jun. 15, 2020

(65) Prior Publication Data

US 2021/0191519 A1 Jun. 24, 2021

Related U.S. Application Data

(63) Continuation of application No. PCT/IB2020/052291, filed on Mar. 13, 2020.

(30) Foreign Application Priority Data

Dec. 23, 2019 (SG) .................... 10201912990Q (51) Int. Cl.
*G06F 3/0482* (2013.01)
*G06F 3/01* (2006.01)
(Continued)

(52) U.S. Cl.
CPC ............ *G06F 3/017* (2013.01); *G06V 40/113* (2022.01); *G06V 40/28* (2022.01)

(58) Field of Classification Search
CPC ........ G06F 3/011; G06F 3/017; G06F 3/0304; G06F 3/04815; G06F 3/04845;
(Continued)

(56) References Cited

U.S. PATENT DOCUMENTS 10,296,102 B1 * 5/2019 Misra .................... G06K 9/2054
11,030,442 B1 * 6/2021 Bergamo ............. G06K 9/6269
(Continued)

FOREIGN PATENT DOCUMENTS

CN 105975906 A 9/2016
CN 105975906 B 1/2018
(Continued)

OTHER PUBLICATIONS

International Search Report and Written Opinion issued in Application No. PCT/IB2020/052291, dated Aug. 18, 2020, 9 pages.
(Continued)

*Primary Examiner* — Rayeez R Chowdhury (57) ABSTRACT

Disclosed are a gesture recognition method and apparatus, an electronic device, and a storage medium. The method includes: obtaining a hand detection result by detecting a to-be-processed image; in response to the hand detection result including a bounding box of hand, determining that a hand pose in the bounding box of hand conforms to a hand pose in a target gesture; determining that the hand is located in a pre-defined area of the to-be-processed image; and determining that the hand makes the target gesture.

11 Claims, 4 Drawing Sheets

(51) Int. Cl.
*G06V 40/20* (2022.01)
*G06V 40/10* (2022.01)

(58) Field of Classification Search
CPC .... G06F 3/013; G06F 3/0346; G06F 3/04842; G06F 1/163; G06F 1/1694; G06F 21/32; G06F 21/83; G06F 3/014; G06F 3/038
See application file for complete search history.

(56) References Cited

U.S. PATENT DOCUMENTS

| | | | |
|---|---|---|---|
| 2013/0278504 A1* | 10/2013 | Tong | G06K 9/00355 |
| | | | 345/158 |
| 2014/0361985 A1† | 12/2014 | Arai | |
| 2015/0019391 A1† | 1/2015 | Kumar | |
| 2015/0170005 A1* | 6/2015 | Cohen | G06F 16/7328 |
| | | | 382/180 |
| 2015/0294483 A1† | 10/2015 | Wells | |
| 2016/0335837 A1† | 11/2016 | Shigeta | |
| 2019/0188957 A1* | 6/2019 | Bulzacki | G07F 17/3225 |
| 2019/0347893 A1* | 11/2019 | Shigeta | G06Q 40/12 |
| 2020/0402342 A1* | 12/2020 | Kelly | G06N 3/006 |

FOREIGN PATENT DOCUMENTS

| | | |
|---|---|---|
| CN | 108549489 A | 9/2018 |
| CN | 109002811 A | 12/2018 |
| CN | 109190559 A | 1/2019 |
| CN | 110276292 A | 9/2019 |

OTHER PUBLICATIONS

Search Report and Written Opinion for Singapore Application No. 10201912990Q, dated Feb. 6, 2020, 10 pages.
Valentin Bazarevsky and Fan Zhang; "On-Device, Real-Time Hand Tracking with MediaPipe", Aug. 19, 2019, 5 pages.
Mantecón et al., "A real-time gesture recognition system using near-infrared imagery", Plos One, Oct. 3, 2019, 33 pages.
Bambach et al., "Lending A Hand: Detecting Hands and Recognizing Activities in Complex Egocentric Interactions", 2015 IEEE International Conference on Computer Vision (ICCV), Feb. 18, 2016, 9 pages.
Office Action Issued in Australia Application No. 2020294217, dated Aug. 4, 2021, 4 pages.
Macao Intellectual Property Office, Disagreement issued in Application No. I/1673, dated Nov. 23, 2021, 31 pages.

\* cited by examiner
† cited by third party

GESTURE RECOGNITION METHOD AND APPARATUS, ELECTRONIC DEVICE, AND STORAGE MEDIUM

CROSS REFERENCE TO RELATED APPLICATIONS

This application is a continuation of International Application No. PCT/IB2020/052291, filed on Mar. 13, 2020, which claims priority to Singaporean Patent Application No. 10201912990Q entitled "GESTURE RECOGNITION METHOD AND APPARATUS, ELECTRONIC DEVICE, AND STORAGE MEDIUM" and filed on Dec. 23, 2019, all of which are incorporated herein by reference in their entirety.

TECHNICAL FIELD

The present disclosure relates to computer vision technologies, and in particular, to a gesture recognition method and apparatus, an electronic device, and a storage medium.

BACKGROUND

In recent years, with continuous development of an artificial intelligence technology, the artificial intelligence technology achieves good effects in aspects such as computer vision, speech recognition, and so on. The gesture recognition is performed in some relatively special scenes, such as a tabletop game scene, by using the artificial intelligence technology.

SUMMARY

The present disclosure provides solutions for gesture recognition.

According to the first aspect of the present disclosure, a gesture recognition method is provided. The method includes: obtaining a hand detection result by detecting a to-be-processed image; in response to the hand detection result including a bounding box of hand, determining that a hand pose in the bounding box of hand conforms to a hand pose in a target gesture; determining that the hand is located in a pre-defined area of the to-be-processed image; and determining that the hand makes the target gesture.

In combination with any implementation provided by the present disclosure, in response to the hand detection result including the bounding box of hand, determining that the hand pose in the bounding box of hand conforms to the hand pose in the target gesture includes: in response to the hand detection result including the bounding box of hand, cropping an image located in the bounding box of hand in the to-be-processed image; and determining, according to the cropped image, that the hand pose in the cropped image conforms to the hand pose in the target gesture.

In combination with any implementation provided by the present disclosure, the hand pose in the target gesture is two hands both facing up; and determining that the hand pose in the bounding box of hand conforms to the hand pose in the target gesture includes: inputting an image in the bounding box of hand into a hand classification neural network to obtain a hand classification result, the hand classification result comprising the hand facing up or the hand with other poses; and when hand classification results of two bounding boxes of hand are hands facing up, determining that the hand poses in the bounding boxes of hand conform to the hand pose in the target gesture.

In combination with any implementation provided by the present disclosure, the hand classification neural network is obtained by training with hand image samples, a hand image sample comprising an image sample for the hand facing up, and an annotation information of the image sample for the hand facing up being a palm of the hand.

In combination with any implementation provided by the present disclosure, determining that the hand is located in the pre-defined area of the to-be-processed image includes: determining that a center point of the bounding box of hand is located in the pre-defined area.

In combination with any implementation provided by the present disclosure, the to-be-processed image is an image obtained by capturing a target area, and the pre-defined area in the to-be-processed image comprises two set sub-areas corresponding to two sub-areas in the target area respectively; and determining that the center point of the bounding box of hand is located in the pre-defined area includes: determining that the center points of the two bounding boxes of hand are located in the two set sub-areas, respectively.

In combination with any implementation provided by the present disclosure, the to-be-processed image is an image of the target area captured at a top view.

According to the second aspect of the present disclosure, a gesture recognition apparatus is provided. The apparatus includes: an obtaining unit, configured to obtain a hand detection result by detecting a to-be-processed image; a first determining unit, configured to, in response to the hand detection result including a bounding box of hand, determine that a hand pose in the bounding box of hand conforms to a hand pose in a target gesture; a second determining unit, configured to determine that the hand is located in a pre-defined area of the to-be-processed image; and a third determining unit, configured to determine that the hand makes the target gesture.

In combination with any implementation provided by the present disclosure, the first determining unit is further configured to: in response to the hand detection result including the bounding box of hand, crop an image located in the bounding box of hand in the to-be-processed image; and determine, according to the cropped image, that the hand pose in the cropped image conforms to the hand pose in the target gesture.

In combination with any implementation provided by the present disclosure, the hand pose in the target gesture is two hands both facing up; the first determining unit is further configured to: input an image in the bounding box of hand into a hand classification neural network to obtain a hand classification result, the hand classification result comprising the hand facing up or the hand with other poses; and when hand classification results of two bounding boxes of hand are hands facing up, determine that the hand poses in the bounding boxes of hand conform to the hand pose in the target gesture.

In combination with any implementation provided by the present disclosure, the hand classification neural network is obtained by training with hand image samples, a hand image sample comprising an image sample for the hand facing up, and an annotation information of the image sample for the hand facing up being a palm of the hand.

In combination with any implementation provided by the present disclosure, the second determining unit is further configured to: determine that a center point of the bounding box of hand is located in the pre-defined area.

In combination with any implementation provided by the present disclosure, the to-be-processed image is an image obtained by capturing a target area, and the pre-defined area in the to-be-processed image comprises two set sub-areas corresponding to two sub-areas in the target area respectively; the second determining unit is further configured to: determine that the center points of the two bounding boxes of hand are located in the two set sub-areas, respectively.

In combination with any implementation provided by the present disclosure, the to-be-processed image is an image of the target area captured at a top view.

According to the third aspect of the present disclosure, an electronic device is provided, and the electronic device includes: a processor, and a memory for storing computer instructions executable by the processor, where the processor is configured to execute the computer instructions to implement the gesture recognition method according to the first aspect.

According to the fourth aspect of the present disclosure, a non-volatile computer-readable storage medium is provided, the storage medium stores a computer program that, when executed by a processor, cause the processor to implement the gesture recognition method according to the first aspect.

In a gesture recognition method and apparatus, an electronic device, and a storage medium according to one or more embodiments of the present disclosure, the hand pose in the bounding box of hand in the hand detection result is detected, and on the basis of determining that the hand pose conforms to the hand pose in the target gesture, plus constraint of detection position information, target gesture recognition is performed. Fast and high-precision target gesture recognition can be realized by using a single image frame.

BRIEF DESCRIPTION OF THE DRAWINGS

To describe the technical solutions in one or more embodiments of the present disclosure or the prior art more clearly, accompanying drawings required for describing the embodiments or the prior art are briefly introduced below. Apparently, the accompanying drawings in the following description show merely some embodiments described in one or more embodiments of the present disclosure, and a person of ordinary skill in the art can still derive other accompanying drawings from these accompanying drawings without creative efforts.

DETAILED DESCRIPTION OF THE EMBODIMENTS

To make a person skilled in the art better understand the technical solutions in one or more embodiments of the present disclosure, the technical solutions in the one or more embodiments of the present disclosure are clearly and fully described below with reference to the accompanying drawings in the one or more embodiments of the present disclosure. Apparently, the described embodiments are merely some of the embodiments of the present disclosure, but not all the embodiments. Based on the one or more embodiments of the present disclosure, all other embodiments obtained by a person of ordinary skill in the art without involving an inventive effort shall fall within the scope of protection of the present disclosure.

At least one embodiment of the present disclosure provides a gesture recognition method. The gesture recognition method may be executed by an electronic device such as a terminal device or a server. The terminal device may be User Equipment (UE), a mobile device, a user terminal, a terminal, a cellular phone, a cordless phone, a Personal Digital Assistant (PDA), a handheld device, a computing device, a vehicle-mounted device, a wearable device, or the like. The method may be implemented by a processor by invoking computer-readable instructions stored in a memory.

Figure 1:
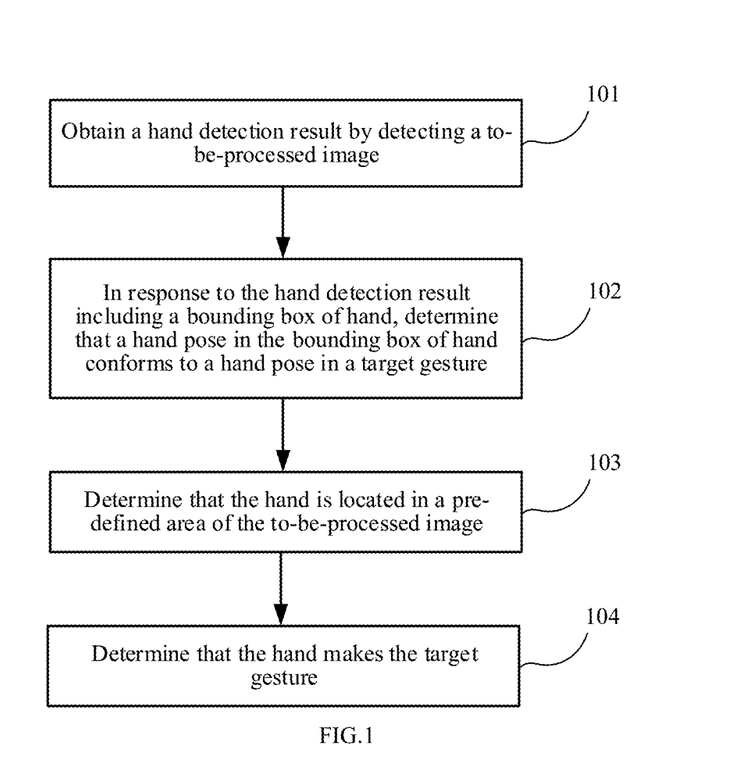
FIG. 1 is a flowchart of a gesture recognition method provided according to at least one embodiment of the present disclosure.

FIG. 1 shows a flow of the gesture recognition method. As shown in FIG. 1, the method may include steps 101-104.

At step 101, a hand detection result is obtained by detecting a to-be-processed image.

In the embodiments of the present disclosure, the to-be-processed image may be an image of a tabletop area captured by an image acquisition device (e.g., a camera). The image may include a complete tabletop image or a partial tabletop image.

The to-be-processed image captured by the camera may be one frame in a video stream or an image captured in real time, which is not limited in the present disclosure.

In the embodiments of the present disclosure, a hand detection result may be obtained by detecting a to-be-processed image by using a deep learning network, for example, a faster RCNN. If a hand is detected, the hand detection result may include a bounding box of hand, a position of the bounding box of hand and the like. A person skilled in the art should understand that the faster RCNN is merely an example, and other networks may be used for hand detection, which is not limited in the present disclosure.

At step 102, in response to the hand detection result including a bounding box of hand, it is determined that a hand pose in the bounding box of hand conforms to a hand pose in a target gesture.

In some embodiments, the to-be-processed image may be captured at a top view, i.e., the to-be-processed image is captured by a bird view camera. For an application scene, e.g., the tabletop, the top view is a good photography view, and the view can generally avoid other objects from blocking a detection target. However, a person skilled in the art should understand that the image captured by the camera at other views may also be applied to the gesture recognition method provided according to the embodiments of the present disclosure.

In the embodiments of the present disclosure, an image in the bounding box of hand is detected, and a detected feature may be compared with a feature of the hand pose in the target gesture to determine whether the hand pose in the bounding box of hand conforms to the hand pose in the target gesture. Or the hand pose in the bounding box of hand is classified, and it may be determined whether the hand pose conform to the hand pose in the target gesture through a classification result. The specific determining method would be described in detail below.

At step 103, it is determined that the hand is located in a pre-defined area of the to-be-processed image.

In the embodiments of the present disclosure, if the hand detection result includes a bounding box of hand, the hand detection result also includes position information of the bounding box of hand, i.e., position information of the hand in the to-be-processed image is determined.

For a target gesture which should appear in a specific area, position constraint is provided for the hand in the bounding box of hand by using the pre-defined area of the to-be-processed image, so that it may be further determined whether the detected hand meets the requirements for the target gesture. The pre-defined area of the to-be-processed image may be determined according to a position and internal parameters of the camera for photographing the to-be-processed image, and the specific area corresponding to the target gesture in an actual space.

At step 104, it is determined that the hand makes the target gesture.

If the hand pose in the bounding box of hand conforms to the hand pose in the target gesture, and the hand is located in the pre-defined area of the to-be-processed image, it is determined that the hand makes the target gesture.

In the embodiments of the present disclosure, the hand pose in the bounding box of hand in a hand detection result is detected, and on the basis of determining that the hand pose conforms to a hand pose in a target gesture, plus constraint of detection position information, target gesture recognition is performed. Thus, fast and high-precision target gesture recognition can be realized by using a single image frame.

In some embodiments, if a hand is detected, i.e., the hand detection result includes a bounding box of hand, an image located in the bounding box of hand in the to-be-processed image may be cropped; and according to the cropped image, it is determined that the hand pose in the cropped image conforms to the hand pose in the target gesture.

By cropping the image in the bounding box of hand and detecting the hand pose according to the cropped image, the efficiency and accuracy of hand gesture detection may be improved.

In some embodiments, a center point of the bounding box of hand is determined as the position of the hand. A person skilled in the art should understand that other position points of the bounding box of hand may also be determined as the position of the hand. For example, when a target gesture to be recognized has a closest relationship with one of fingers, a position of the finger in the bounding box of hand may be determined as the position of the hand. The specific determining mode of the hand position may be determined according to the relationship between the target gesture to be recognized and the bounding box of hand.

In some embodiments, it may be determined that the hand pose in the bounding box of hand conforms to the hand pose in the target gesture in the following ways: the image in the bounding box of hand is input to a pre-trained hand classification neural network to obtain a hand classification result, and it is determined whether the hand pose in the bounding box of hand conforms to the hand pose in the target gesture according to the classification result.

The used hand classification neural network may be a convolutional classification model, for example, a convolutional classification model using Rsenet 18 as a backbone network. A person skilled in the art should understand that the used hand classification neural network may be determined according to a classification type to be obtained; the classification type to be obtained may be determined according to a target gesture to be recognized. No limitation is made thereto in the present disclosure.

In one example, if the target gesture to be recognized relates only to a hand facing up, the classification type to be obtained may include the hand facing up or the hand with other poses, where the other poses include hand poses other than the hand facing up and the hand being blocked. The hand classification neural network may be trained with image samples including the hand facing up and/or the hand with other poses, and an annotation information of the image sample for the hand facing up may be a palm of the hand.

In one example, if the target gesture to be recognized relate to a hand facing up or back, the classification type to be obtained may include the hand facing up, the hand facing back, and the hand with other poses, where the other poses include hand poses other than the hand facing up and the hand facing back, and the hand being blocked. The hand classification neural network may be trained with image samples including a hand facing up, the hand facing back, and the hand with other poses, where an annotation information of the image sample for the hand facing up may a palm of the hand, and the annotation information of the image sample for the hand facing back may be an identifier indicating the back of the hand.

In one example, if the target gesture to be recognized relates to a specific pose, the classification type needs to include the specific pose, and the hand classification neural network may be trained with sample hand images including the specific pose and other poses, so that the trained hand classification neural network recognizes the specific pose from the image in the bounding box of hand.

A person skilled in the art should understand that other methods may also be used to determine that the hand pose in the bounding box of hand conforms to the hand pose in the target gesture, to perform gesture detection by using the hand pose in the bounding box of hand, and the like. No limitation is made thereto in the present disclosure.

By taking the fact that a target gesture to be recognized is both hands facing up and the hands are located above two specific sub-areas of the tabletop respectively as an example, the gesture recognition method provided according to the embodiments of the present disclosure is described in detail below. A person skilled in the art should understand that the gesture recognition method is not limited to recognizing the target gesture and may also be used for recognizing other target gestures.

Figure 2:
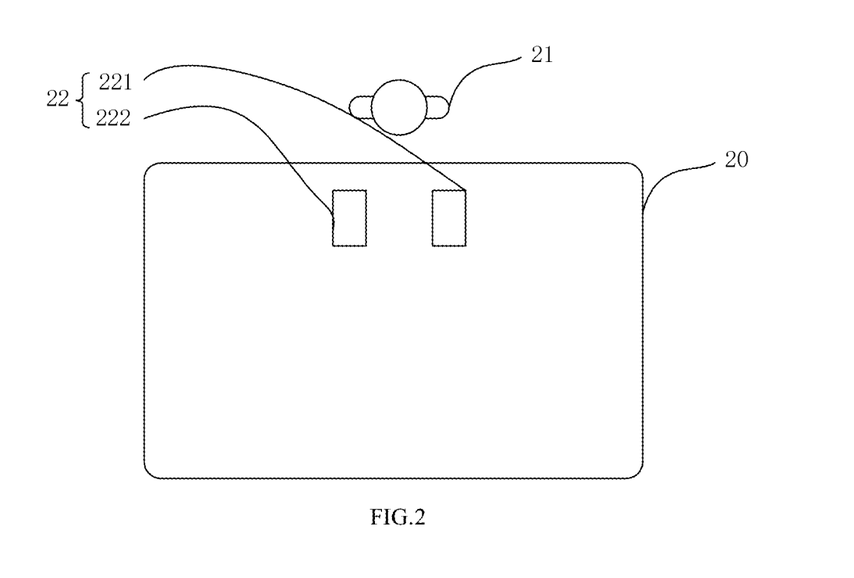
FIG. 2 is a schematic diagram of an application scene of a gesture recognition method provided according to at least one embodiment of the present disclosure.

FIG. 2 is a schematic diagram of an application scene of a gesture recognition method provided according to at least one embodiment of the present disclosure. As shown in FIG. 2, the target gesture to be recognized is the gesture with two palms facing up above two areas 221 and 222 of a tabletop 20. The two areas 221 and 222 are near a person 21.

A hand detection result is obtained by detecting a to-be-processed image including a complete area or a partial area of the tabletop 20 photographed at a top view.

If a hand of the person 21 is detected, i.e., the hand detection result includes a bounding box of hand, the image in the bounding box of hand is input to a hand classification neural network to obtain a hand classification result. The hand classification neural network is used for classifying the input image as a hand facing up or the hand with other poses, so as to obtain the hand classification result including the hand facing up or the hand with other poses. If the classification results of the two bounding boxes of hand are hands facing up, it is determined that the hand poses in the bounding boxes of hand are hands facing up, and conform to the hand pose in the target gesture.

Upon determining both hands facing up, it is determined whether positions of the two bounding boxes of hand are located in two set sub-areas of the to-be-processed image. The two set sub-areas of the to-be-processed image are determined according to a position and internal parameters of the camera for photographing the to-be-processed image, and positions of the two areas 221 and 222 of the tabletop 20. In response to center points of the two bounding boxes of hand being located in the two set sub-areas respectively, it is determined that the hand makes a target gesture, where the two set sub-areas respectively correspond to two sub-areas in a target area in the to-be-processed image. When the target area is a game table, the two sub-areas in the target area may be two sub-areas of the game table, and the two set sub-areas are areas in the to-be-processed image which respectively correspond to the two sub-areas of the game table.

In one example, an image cropped according to the bounding box of hand may be input into the hand classification neural network to obtain the hand classification result. If the to-be-processed image includes multiple bounding boxes of hand, multiple cropped images are input into the hand classification neural network, respectively.

The hand classification neural network used for classifying the input image as the hand facing up or the hand with other poses may be trained in the following ways.

Image samples including a hand facing up and a hand with other poses are obtained, and for an image sample for a hand facing up, a center of a palm in the image sample is annotated.

Figure 3A:
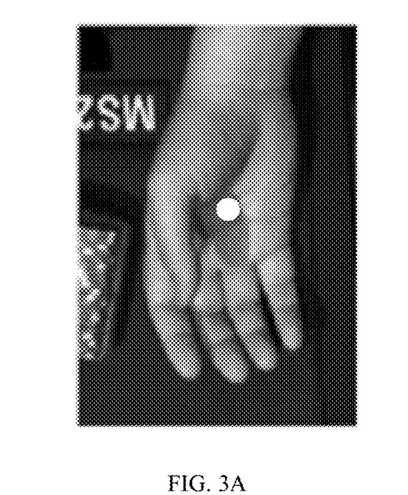
FIGS. 3A-3F are schematic diagrams of hand classification results provided according to at least one embodiment of the present disclosure.
Figure 3B:
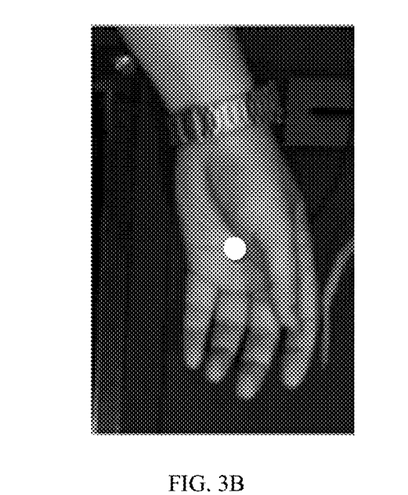

FIGS. 3A and 3B are exemplary image samples with hands facing up. The hand image with the palm facing up may be taken as an image sample for the hand facing up, and an annotation information of the image sample with the hand facing up may be a center of the palm. White points in the palms in FIGS. 3A and 3B are annotations of the image samples with the hands facing up. The annotation information of the image sample for the hand facing up may also be any shape at the palm, such as some points, a circle, a square, which is not limited herein. FIGS. 3C-3F are exemplary hand images with other poses which are a hand image with the hand facing back or the palm being blocked, and the hand images may be annotated as other poses.

The hand classification neural network is trained by using the image samples as shown in FIGS. 3A-3F, and the trained neural network can classify the image in the bounding box of hand so as to obtain a classification result as the hand facing up or the hand with other poses.

Figure 3C:
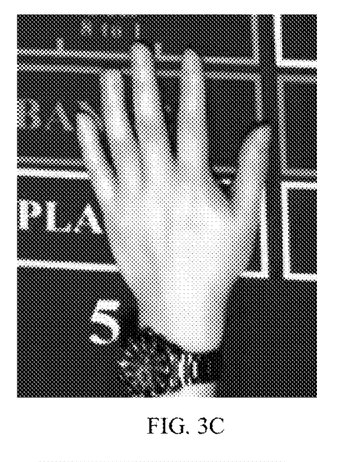
Figure 3D:
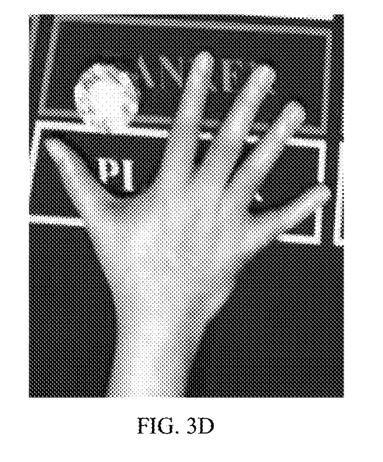
Figure 3E:
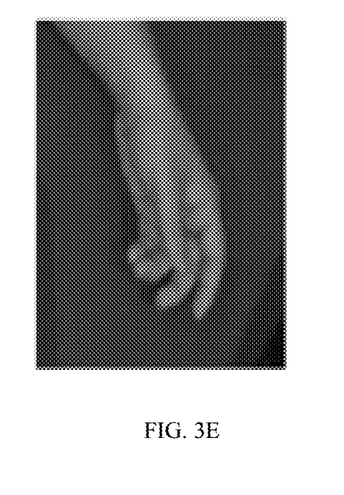
Figure 3F:
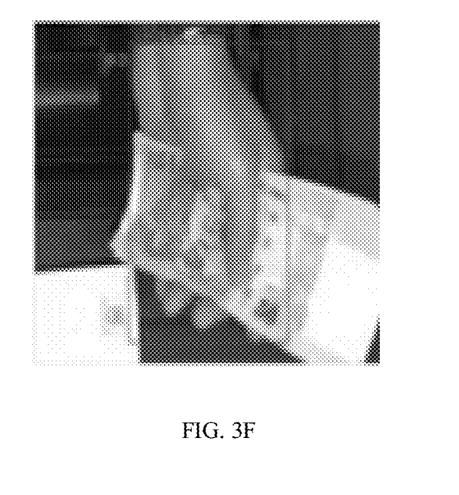

In some embodiments, the image in the bounding box of hand may be classified by using the hand classification neural network, so as to obtain a classification result as the hand facing up, the hand facing back, or the hand with other poses. The hand classification neural network may be trained by image samples with the hand facing up, the hand facing back, and the hand with other poses. FIGS. 3A-3F are still taken as examples. FIGS. 3A and 3B are exemplary image samples for hands facing up, and annotation information of the image samples with hands facing up may be centers of palms. FIGS. 3C and 3D are exemplary image samples for hands facing back. The hand image with a complete back of hand and five fingers may be taken as an image with hand facing back, and the hand image is annotated as a back side. FIGS. 3E and 3F are exemplary image samples for hands with other poses. A hand image that fails to see a center of a palm, and also fails to see a complete back of hand and five fingers may be taken as an image sample for the hand with other poses, and the hand image is annotated as other poses.

In FIGS. 3E and 3F, although the overall poses face up, centers of palms cannot be seen, and therefore, the poses are other poses. The hand classification neural network is trained by using the image samples, and the trained neural network can classify the image in the bounding box of hand so as to obtain a classification result as the hand facing up, the hand facing back, or the hand with other poses.

In the embodiments of the present disclosure, the image in the bounding box of hand is classified by using the hand classification neural network, so as to recognize whether the hand is presents a pose facing up, i.e., a pose with the palm facing up. In this case, compared with a video classification neural network, the used hand classification neural network is easy to obtain and annotate training samples, the recognition speed of the neural network is high, and thus, real-time recognition for the hand pose can be implemented.

On the basis that the hand classification result conforms to the hand pose in the target gesture, position constraint is performed on the pre-defined area of the to-be-processed image to further determine that the detected hand makes the target gesture.

The gesture recognition method provided according to the embodiments of the present disclosure is described below by taking a target gesture as a clean hand gesture of a dealer as an example.

Figure 4:
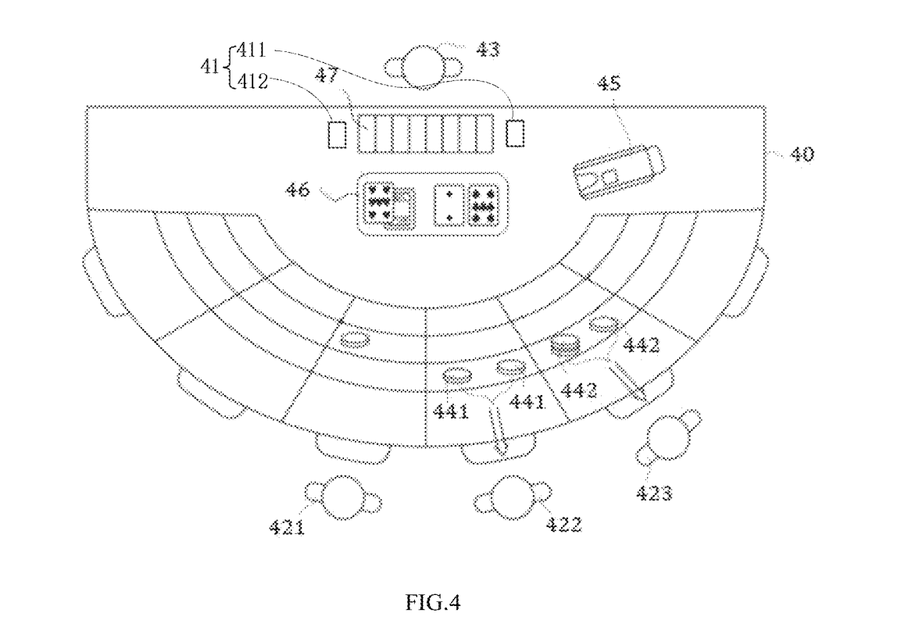
FIG. 4 is a schematic diagram of an application scene of a gesture recognition method provided according to at least one embodiment of the present disclosure.

FIG. 4 is a schematic diagram of an application scene of a gesture recognition method provided according to at least one embodiment of the present disclosure. As shown in FIG. 4, in a game scene, games can be played through a game table 40, and players 421, 422, 423 and a dealer 43 are located on opposite sides of the game table. Areas of the game table mainly includes: an exchanged object area 47 of the dealer (an area in front of the dealer), exchanged object areas 441, 442 of the players (areas in front of the players), a game playing area 46, and a pre-defined area 41 (which can also be referred to as a hot area).

The clean hand gesture of the dealer indicates that after completing a specific operation or before executing a specific operation, two palms of the dealer face up and are horizontally placed on the two sides of the exchanged object area of the dealer (as the exchanged object area 47 in FIG. 4). Thus, the dealer shows to others that there is nothing in the hands, and indicates being capable of proceeding to the next game stage.

In the embodiments of the present disclosure, two sub-areas (e.g., sub-areas 411 and 412 in FIG. 4) on the two sides of the exchanged object area 47 in front of the dealer on the game table may be taken as the specific area of the actual space (i.e., the two sub-areas of the target area). The two set sub-areas corresponding to a to-be-processed image are determined through a position and internal parameters of a camera 45 for photographing the to-be-processed image, and a position of the specific area (e.g., the sub-areas 411 and 412) so as to perform position constraint on the hand classification result.

The to-be-processed image including a complete area or a partial area of the game table 40 is detected. If an obtained hand detection result includes a bounding box of hand, an image in the bounding box of hand is input into a pre-trained hand classification neural network. The hand classification neural network is capable of classifying the input image as a hand facing up or the hand with other poses. In response to the classification results of the images of the two hand detections bounding boxes being hands both facing up, it is further determined whether the positions of the two bounding boxes of hand are located in the two set sub-areas of the to-be-processed image. If the two bounding boxes of hand are respectively located in the two set sub-areas, it is indicated that the two hands respectively enter the hot area on the game table 40, and thus, it may be determined that the detected hands make a clean hand gesture.

After it is determined that the dealer makes the clean hand gesture, the next processing process may be directly entered by generating a trigger signal, for example, monitoring of the game process is enabled, a user does not need to enable the monitoring through a button (a hardware trigger), thus improving user experience. Moreover, by recognizing the clean hand gesture of the dealer, whether any forbidden objects are carried in the hands of the dealer may also be monitored.

Figure 5:
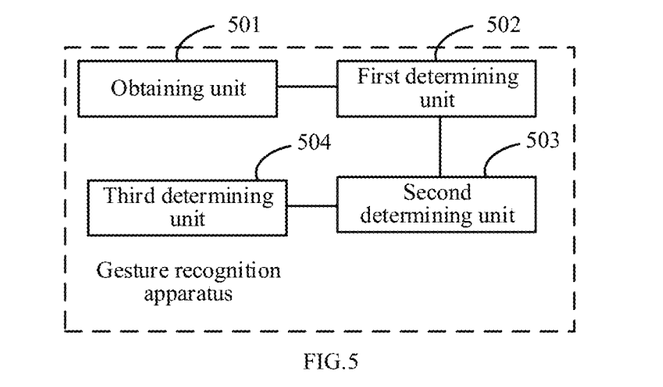
FIG. 5 is a schematic structural diagram of a gesture recognition apparatus provided according to at least one embodiment of the present disclosure.

FIG. 5 is a schematic structural diagram of a gesture recognition apparatus provided according to at least one embodiment of the present disclosure. As shown in FIG. 5, the apparatus includes: an obtaining unit 501, configured to obtain a hand detection result by detecting a to-be-processed image; a first determining unit 502, configured to, in response to the hand detection result including a bounding box of hand, determine that a hand pose in the bounding box of hand conforms to a hand pose in a target gesture; a second determining unit 503, configured to determine that the hand is located in a pre-defined area of the to-be-processed image; and a third determining unit 504, configured to determine that the hand makes the target gesture.

In some embodiments, the first determining unit 502 is specifically configured to, in response to the hand detection result including the bounding box of hand, crop an image located in the bounding box of hand in the to-be-processed image; and determine, according to the cropped image, that the hand pose in the cropped image conforms to the hand pose in the target gesture.

In some embodiments, the hand pose in the target gesture is two hands both facing up; and the first determining unit configured to determine that a hand pose in the bounding box of hand conforms to a hand pose in a target gesture, is specifically configured to: input an image in the bounding box of hand to a hand classification neural network to obtain a hand classification result, the hand classification result including the hand facing up or the hand with other poses; and when hand classification results of two bounding boxes of hand are hands facing up, determine that the hand poses in the bounding boxes of hand conform to the hand pose in the target gesture.

In some embodiments, the hand classification neural network is obtained by training with hand image samples, a hand image sample comprising an image sample for the hand facing up, and an annotation information of the image sample for the hand facing up being a palm of the hand.

In some embodiments, the second determining unit is specifically configured to: determine that a center point of the bounding box of hand is located in the pre-defined area.

In some embodiments, the to-be-processed image is an image obtained by capturing a target area, and the pre-defined area in the to-be-processed image comprises two set sub-areas corresponding to two sub-areas in the target area respectively; and the second determining unit 504 is specifically configured to: determine that the center points of the two bounding boxes of hand are located in the two set sub-areas, respectively.

In some embodiments, the to-be-processed image is an image of the game table captured at a top view.

Figure 6:
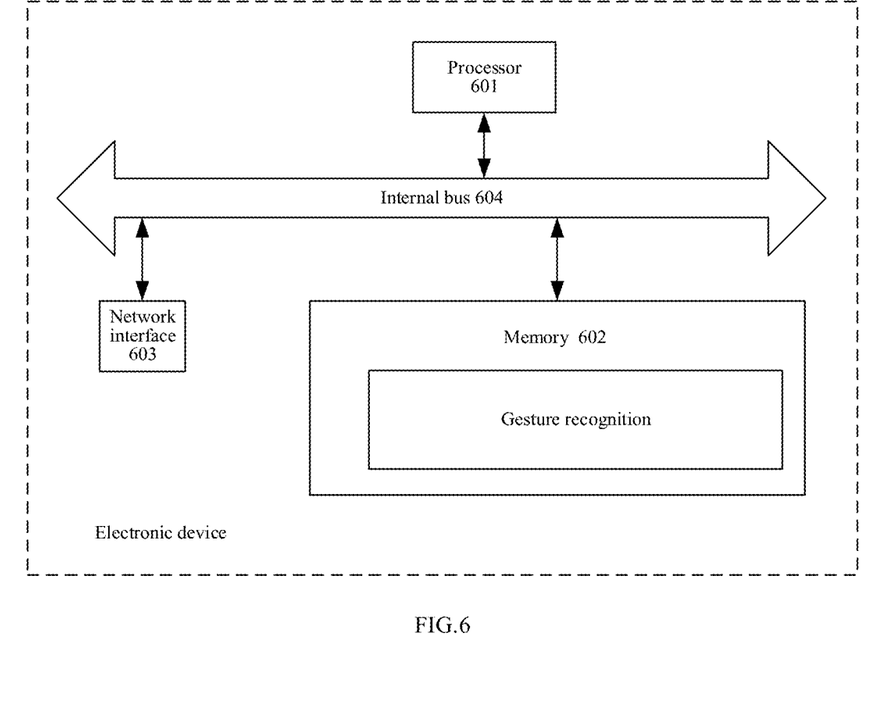
FIG. 6 is a schematic structural diagram of an electronic device provided according to at least one embodiment of the present disclosure.

FIG. 6 is a schematic structural diagram of an electronic device provided according to at least one embodiment of the present disclosure. The device includes: a processor 601; and a memory 602 storing computer instructions executable by the processor, where the processor 601 is configured to invoke the instructions stored in the memory 602 to implement the gesture recognition method according to at least one embodiment. The electronic device may further include a network interface 603 for communicating other devices such as a camera, and a bus 604. The processor 601, the memory 602 and the network 603 communicate with each other through the bus 604.

The embodiments of the present disclosure further provide a non-volatile computer-readable storage medium storing a computer program that, when executed by a processor, cause the processor to implement the gesture recognition method according to at least one embodiment.

A person skilled in the art should understand that one or more embodiments of the present disclosure may be provided as a method, a system or a computer program product. Therefore, one or more embodiments of the present disclosure may use a form of hardware only embodiments, software only embodiments, or embodiments with a combination of software and hardware. Moreover, one or more embodiments of the present disclosure may use a form of a computer program product that is implemented on one or more computer-readable storage media (including but not limited to a disk memory, a CD-ROM, an optical memory, etc.) that include a computer-readable program code.

"And/or" in the present disclosure means at least one of the two, e.g., "A and/or B" includes three schemes: A, B, and "A and B".

The embodiments of the present disclosure are all described in a progressive way, for same or similar parts in the embodiments, reference can be made to these embodiments, and each embodiment focuses on a difference from other embodiments. In particular, for an embodiment of a gesture recognition apparatus, the embodiment is substantially similar to the method embodiment and therefore is only described briefly, and for related parts, reference can be made to partial descriptions in the method embodiment.

Specific embodiments of the present disclosure are described above. Other embodiments are within the scope of the appended claims. In some instances, the actions or steps recited in the claims may be performed in a sequence different from that in the embodiments and still achieve a desirable result. In addition, the process described in the accompanying drawings does not necessarily need a specific sequence or a consecutive sequence to achieve the desired result. In some implementations, multitask processing and parallel processing can be feasible or can be advantageous.

The embodiments of the subject matter and functional operations described in the present disclosure may be implemented in digital electronic circuitry, tangible computer software or firmware, computer hardware including the structures disclosed in the present disclosure and structural equivalents thereof, or a combination of one or more thereof. The embodiments of the subject matter described in the present disclosure may be implemented as one or more computer programs, i.e., one or more modules of computer program instructions encoded on a tangible non-transitory program carrier to be executed by a data processing apparatus or to control operations of the data processing apparatus. Alternatively, or additionally, the program instructions may be encoded on artificially generated propagated signals, such as machine-generated electrical, optical or electromagnetic signals, generated to encode and transmit information to a suitable receiver apparatus for execution by the data processing apparatus. The computer storage medium may be a machine readable storage device, a machine readable storage substrate, a random or serial access memory device, or a combination of one or more thereof.

Processes and logic flows described in the present disclosure may be performed by one or more programmable computers for executing one or more computer programs, so as to execute corresponding functions by performing operations according to input data and generating output. The processes and logic flows may also be performed by a dedicated logic circuit, such as an FPGA (field programmable gate array) or an ASIC (application specific integrated circuit), and the apparatus may also be implemented as a dedicated logic circuit.

Computers applicable to executing computer programs include, for example, a universal and/or dedicated microprocessor, or any other type of central processing unit. Usually, the central processing unit will receive instructions and data from a read-only memory and/or a random access memory. Basic components of the computer include a central processing unit for implementing or executing instructions and one or more memory devices storing instructions and data. Usually, the computer may also include one or more mass storage devices for storing data, such as a magnetic disk, a magneto-optical disk or an compact disk, or the computer will be operably coupled to the mass storage device to receive data from the mass storage device or transmit data to the mass storage device, or to do both. However, the computer may not necessarily have such device. Further, the computer may be embedded in another device, such as a mobile phone, a Personal Digital Assistant (PDA), a mobile audio or video player, a game console, a Global Positioning System (GPS) receiver, or a portable storage device such as a Universal Serial Bus (USB) flash drive, which are only illustrated as examples.

A computer-readable medium applicable to storing computer program instructions and data include all forms of non-volatile memories, media and memory devices, such as a semiconductor memory device (e.g., an Erasable Programmable Read-Only Memory (EPROM), an Electrically Erasable Programmable Read-Only Memory (EEPROM), and a flash memory device), a magnetic disk (e.g., an internal hard disk or a mobile disk), a magneto-optical disk, CD-ROM and DVD-ROM. The processor and the memory may be supplemented by or incorporated in a dedicated logical circuit.

While the present disclosure contains many specific implementation details, these should not be construed as limitations on the scope of any disclosure or of what may be claimed, but rather as descriptions of features that may be specific to particular implementations of particular disclosure. Certain features that are described in multiple embodiments in the present disclosure can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, although operations are described in the accompanying drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

The above descriptions are only some embodiments of the present disclosure and are not intended to limit one or more embodiments of the present disclosure. Any modifications, equivalent substitutions and improvements made without departing from the spirit and principle of one or more embodiments of the present disclosure are intended to be included within the scope of one or more embodiments of the present disclosure.

The invention claimed is:

1. A gesture recognition method, comprising:
   obtaining a hand detection result by detecting a to-be-processed image, wherein the to-be-processed image is an image obtained by capturing a target area;
   in response to the hand detection result comprising a bounding box of a hand, determining that a hand pose in the bounding box of the hand conforms to a hand pose in a target gesture;
   determining that the hand is located in a pre-defined area of the to-be-processed image, wherein the pre-defined area in the to-be-processed image comprises two set sub-areas corresponding to two sub-areas in the target area respectively; and
   determining that the hand in the to-be-processed image makes the target gesture,
   wherein determining that the hand is located in the pre-defined area of the to-be-processed image comprises:
   determining that center points of two bounding boxes of the hand are located in the two set sub-areas of the to-be-processed image, respectively.

2. The method according to claim 1, wherein in response to the hand detection result comprising the bounding box of the hand, determining that the hand pose in the bounding box of the hand conforms to the hand pose in the target gesture comprises:
   in response to the hand detection result comprising the bounding box of the hand, cropping an image located in the bounding box of the hand in the to-be-processed image; and
   determining, according to the cropped image, that the hand pose in the cropped image conforms to the hand pose in the target gesture.

3. The method according to claim 1, wherein the hand pose in the target gesture is two hands both facing up; and
   determining that the hand pose in the bounding box of the hand conforms to the hand pose in the target gesture comprises:
   inputting an image in the bounding box of the hand into a hand classification neural network to obtain a hand classification result, the hand classification result comprising the hand facing up or the hand with other poses; and
   when hand classification results of two bounding boxes of a hand are hands facing up, determining that hand poses in the two bounding boxes of the hand conform to the hand pose in the target gesture.

4. The method according to claim 3, wherein the hand classification neural network is obtained by training with hand image samples, a hand image sample comprising an image sample for the hand facing up, and an annotation information of the image sample for the hand facing up being a palm of the hand.

5. The method according to claim 1, wherein the to-be-processed image is an image of the target area captured at a top view.

6. An electronic device, comprising:
a processor, and
a memory for storing computer instructions executable by the processor,
wherein the processor is configured to:
obtain a hand detection result by detecting a to-be-processed image, wherein the to-be-processed image is an image obtained by capturing a target area;
in response to the hand detection result comprising a bounding box of a hand, determine that a hand pose in the bounding box of the hand conforms to a hand pose in a target gesture;
determine that the hand is located in a pre-defined area of the to-be-processed image, wherein the pre-defined area in the to-be-processed image comprises two set sub-areas corresponding to two sub-areas in the target area respectively; and
determine that the hand in the to-be-processed image makes the target gesture,
wherein the processor is configured to determine that the hand is located in the pre-defined area of the to-be-processed image by:
determining that center points of two bounding boxes of the hand are located in the two set sub-areas of the to-be-processed image, respectively.

7. The electronic device according to claim 6, wherein in response to the hand detection result comprising the bounding box of the hand, determining that the hand pose in the bounding box of the hand conforms to the hand pose in the target gesture comprises:
in response to the hand detection result comprising the bounding box of the hand, cropping an image located in the bounding box of the hand in the to-be-processed image; and
determining, according to the cropped image, that the hand pose in the cropped image conforms to the hand pose in the target gesture.

8. The electronic device according to claim 6, wherein the hand pose in the target gesture is two hands both facing up; and
determining that the hand pose in the bounding box of the hand conforms to the hand pose in the target gesture comprises:
inputting an image in the bounding box of the hand into a hand classification neural network to obtain a hand classification result, the hand classification result comprising the hand facing up or the hand with other poses; and
when hand classification results of two bounding boxes of a hand are hands facing up, determining that hand poses in the two bounding boxes of the hand conform to the hand pose in the target gesture.

9. The electronic device according to claim 8, wherein the hand classification neural network is obtained by training with hand image samples, a hand image sample comprising an image sample for the hand facing up, and an annotation information of the image sample for the hand facing up being a palm of the hand.

10. The electronic device according to claim 6, wherein the to-be-processed image is an image of the target area captured at a top view.

11. A non-transitory computer-readable storage medium storing a computer program that, when executed by a processor, cause the processor to:
obtain a hand detection result by detecting a to-be-processed image, wherein the to-be-processed image is an image obtained by capturing a target area;
in response to the hand detection result comprising a bounding box of a hand, determine that a hand pose in the bounding box of the hand conforms to a hand pose in a target gesture;
determine that the hand is located in a pre-defined area of the to-be-processed image, wherein the pre-defined area in the to-be-processed image comprises two set sub-areas corresponding to two sub-areas in the target area respectively; and
determine that the hand in the to-be-processed image makes the target gesture;
wherein the computer program causes the processor to determine that the hand is located in the pre-defined area of the to-be-processed image by:
determining that center points of two bounding boxes of the hand are located in the two set sub-areas of the to-be-processed image, respectively.

* * * * *